US011475580B2

(12) United States Patent
Huang et al.

(10) Patent No.: US 11,475,580 B2
(45) Date of Patent: Oct. 18, 2022

(54) DEPTH CALCULATION PROCESSOR AND MOBILE TERMINAL

(71) Applicant: ORBBEC INC., Guangdong (CN)

(72) Inventors: Yuanhao Huang, Shenzhen (CN); Zhenzhong Xiao, Shenzhen (CN); Lianghong Zhong, Shenzhen (CN); Xiaolu Mei, Shenzhen (CN); Xing Xu, Shenzhen (CN); Xu Chen, Shenzhen (CN)

(73) Assignee: Orbbec Inc., Shenzhen (CN)

( * ) Notice: Subject to any disclaimer, the term of this patent is extended or adjusted under 35 U.S.C. 154(b) by 149 days.

(21) Appl. No.: 16/985,457

(22) Filed: Aug. 5, 2020

(65) Prior Publication Data

US 2020/0364890 A1 Nov. 19, 2020

Related U.S. Application Data

(63) Continuation of application No. PCT/CN2018/092836, filed on Jun. 26, 2018.

(30) Foreign Application Priority Data

Feb. 7, 2018 (CN) .......................... 201810125080.1

(51) Int. Cl.
*G06T 7/50* (2017.01)
*G06T 7/90* (2017.01)
*G06T 7/00* (2017.01)

(52) U.S. Cl.
CPC .............. *G06T 7/50* (2017.01); *G06T 7/0002* (2013.01); *G06T 7/90* (2017.01)

(58) Field of Classification Search
CPC .............. H04N 5/2256; H04M 1/0264; H04M 2250/52; G06T 7/90; G06T 7/50
See application file for complete search history.

(56) References Cited

U.S. PATENT DOCUMENTS 9,829,309 B2 11/2017 Ge et al.
10,194,138 B2 1/2019 Zhou et al.
(Continued)

FOREIGN PATENT DOCUMENTS

CN 102207673 A 10/2011
CN 102289145 A 12/2011
(Continued)

OTHER PUBLICATIONS

PCT International Preliminary Report on Patentability dated Aug. 20, 2020, issued in related International Application No. PCT/CN2018/092836, with English translation (10 pages).

(Continued)

*Primary Examiner* — Sam Bhattacharya
(74) *Attorney, Agent, or Firm* — Sheppard Mullin Richter & Hampton LLP

(57) ABSTRACT

A depth calculation processor comprises: an input port, configured to receive image data from an image sensor; a demultiplexer, connected to the input port, and configured to demultiplex the image data from the input port and output first image data into a first line and second image data into a second line; a grayscale image engine, configured to process the first image data from the first line to generate processed first image data; a depth image engine, configured to receive the second image data from the second line, and calculate depth image data based on the second image data; a multiplexer, configured to output the processed first image data from the grayscale image engine and the depth image data from the depth image engine; and an output port, configured to output the processed first image data and the depth image data from the multiplexer.

5 Claims, 6 Drawing Sheets

(56) References Cited

U.S. PATENT DOCUMENTS

| | | |
|---|---|---|
| 2010/0265316 A1 | 10/2010 | Sali et al. |
| 2015/0085070 A1 | 3/2015 | Bruls et al. |
| 2016/0081553 A1 | 3/2016 | Weber et al. |
| 2016/0309134 A1 | 10/2016 | Venkataraman et al. |
| 2017/0168293 A1 | 6/2017 | Dinesen |
| 2017/0310946 A1 | 10/2017 | Ge et al. |
| 2019/0295271 A1 | 9/2019 | Xu et al. |

FOREIGN PATENT DOCUMENTS

| | | |
|---|---|---|
| CN | 104205821 A | 12/2014 |
| CN | 104506838 A | 4/2015 |
| CN | 105120257 A | 12/2015 |
| CN | 105469416 A | 4/2016 |
| CN | 105931240 A | 9/2016 |
| CN | 107105217 A | 8/2017 |
| CN | 107424187 A | 12/2017 |

OTHER PUBLICATIONS

PCT International Search Report and the Written Opinion dated Aug. 22, 2018, issued in related International Application No. PCT/CN2018/092836, with partial English translation (8 pages).

First Search dated May 7, 2019, issued in related Chinese Patent Application No. 201810125080.1 (2 pages).

First Office Action dated May 15, 2019, issued in related Chinese Patent Application No. 201810125080.1, with English machine translation (18 pages).

Second Office Action dated Oct. 14, 2019, issued in related Chinese Patent Application No. 201810125080.1, with English machine translation (18 pages).

Supplemental Search dated May 20, 2020, issued in related Chinese Patent Application No. 201810125080.1 (2 pages).

Third Office Action dated May 28, 2020, issued in related Chinese Patent Application No. 201810125080.1, with English machine translation (8 pages).

DEPTH CALCULATION PROCESSOR AND MOBILE TERMINAL

CROSS-REFERENCE TO RELATED APPLICATION

The application is a continuation application of International Patent Application No. PCT/CN2018/092836, filed with the China National Intellectual Property Administration (CNIPA) on Jun. 26, 2018, and entitled "DEPTH CALCULATION PROCESSOR AND MOBILE TERMINAL", which is based on and claims priority to and benefit of Chinese Patent Application No. 201810125080.1, filed with the CNIPA on Feb. 7, 2018. The entire contents of all of the above-identified applications are incorporated herein by reference.

TECHNICAL FIELD

The present specification relates to the computer and microelectronics fields, and in particular, to a depth calculation processor and a mobile terminal.

BACKGROUND

Mobile terminals such as a mobile phone and a tablet computer become indispensable electronic devices in people's daily life and bring great convenience to people's life and work. A color camera configured to take photos to record life is practically a standard configuration for a mobile terminal. However, conventional color cameras may no long satisfy increasingly high requirements for mobile terminal devices.

A depth camera can be configured to obtain a target depth image to further implement three-dimensional (3D) scanning, gesture interaction, and augmented reality (AR). In addition, compared with a conventional color image, facial recognition combined with a depth image can achieve higher precision. However, a depth camera usually includes a plurality of parts (for example, a laser projector, an acquisition module, and a depth calculation processor, etc.) Each part, especially the depth calculation processor, further includes a plurality of components. When the depth camera is integrated into the mobile terminal, an integration mode and a data processing mode of each component need to be taken into consideration comprehensively. Otherwise, problems usually occur when the depth camera is integrated into the mobile terminal. As a result, the depth camera cannot adequately perform data calculation and may fail to function properly in the mobile terminal.

The content in the above background is merely used for facilitating the understanding of the inventive concept and technical solutions of the present specification, and shall not necessarily belong to the existing technologies of the present specification. The above background shall not be used for evaluating the novelty and inventive step of the present specification in the absence of clear evidence that the foregoing content has been disclosed on the filing date of the present specification.

SUMMARY

The present specification provides a depth calculation processor and a mobile terminal to resolve a problem in the existing technologies that a depth camera and a mobile terminal cannot be properly integrated.

The present specification provides a depth calculation processor, including: an input port, configured to receive image data input by an image sensor; a demultiplexer (DEMUX), connected to the input port, and configured to demultiplex data from the input port into a first line and a second line; a grayscale image engine, configured to receive and process image data from the first line; a depth image engine, configured to receive image data from the second line and calculate depth image data; a multiplexer (MUX), configured to receive and output image data input by the grayscale image engine and the depth image engine; and an output port, configured to receive and output image data from the MUX.

In an embodiment, a depth calculation processor is provided. The depth calculation processor comprises: an input port, configured to receive image data from an image sensor; a demultiplexer (DEMUX), connected to the input port, and configured to demultiplex the image data from the input port and output first image data into a first line and second image data into a second line; a grayscale image engine, configured to receive and process the first image data from the first line to generate processed first image data; a depth image engine, configured to receive the second image data from the second line, and calculate depth image data based on the second image data; a multiplexer (MUX), configured to receive and output the processed first image data from the grayscale image engine and the depth image data from the depth image engine; and an output port, configured to receive and output the processed first image data and the depth image data from the MUX.

In an embodiment, the input port and/or the output port is a Mobile Industry Processor Interface (MIPI) interface.

In an embodiment, the depth image engine comprises: a buffer, configured to receive the second image data from the second line; an image rotator, configured to perform, after the buffer receives the entire second image data from the second line, a rotation operation on the second image data from the second line to generate a rotated image; and a depth value calculator, configured to receive the rotated image and a reference image to perform a matching calculation to generate the depth image data.

In an embodiment, the grayscale image engine and/or the depth image engine further comprises an automatic exposure (AE) module, configured to receive the first image data from the first line and/or the second image data from the second line, and calculate a value reflecting an exposure amount.

In an embodiment, the second image data of the second line is infrared (IR) structured light image data.

The present specification further provides a depth calculation processor, including: an input port, configured to receive image data input by an image sensor; a depth image engine, configured to receive image data from the input port, and calculate depth image data; and an output port, configured to receive and output the depth image data, wherein the depth image engine comprises: a buffer, configured to receive the image data; an image rotator, configured to perform a rotation operation after the buffer receives the complete image data to generate a rotated image; and a depth value calculator, configured to receive the rotated image and a reference image to perform matching and calculation to generate the depth image data.

In another embodiment, a depth calculation processor is provided. The depth calculation processor comprises: an input port, configured to receive image data from an image sensor; a depth image engine, configured to receive the image data from the input port, and calculate depth image data; and an output port, configured to receive and output the depth image data. The depth image engine comprises: a buffer, configured to receive the image data; an image rotator, configured to perform, after the buffer receives the entire image data, a rotation operation on the image data to generate a rotated image; and a depth value calculator, configured to receive the rotated image and a reference image to perform a matching calculation to generate the depth image data.

In an embodiment, the foregoing depth calculation processor further comprises a grayscale image engine, configured to receive and process image data from the input port, and output the processed image data to the output port.

In an embodiment, the foregoing depth calculation processor further comprises a DEMUX, connected to the input port, and configured to receive the image data from the input port, and output the image data to the depth image engine and/or the grayscale image engine.

In an embodiment, the foregoing depth calculation processor further comprises a MUX, connected to the output port, and configured to receive and output the depth image data from the depth image engine and/or the processed image data from the grayscale image engine through the output port.

The present specification further provides a mobile terminal, including: an application processor; a projection module, configured to project a structured light image; an acquisition module, configured to acquire the structured light image; and a depth calculation processor according to any one of the above, connected to the application processor, the projection module, and the acquisition module, and configured to: control working statuses of the acquisition module and the projection module, receive the structured light image from the acquisition module, calculate a depth image according to the structured light image, and output the depth image to the application processor.

Compared with the existing technologies, beneficial effects of the present specification are as follows.

In the depth calculation processor according to the present specification, an input port, a DEMUX, a grayscale image engine, a depth image engine, a MUX, and an input port are disposed and are connected in a particular connection mode, and an integration mode and a data processing mode of each component are taken into consideration comprehensively, so that when a depth camera equipped with the depth calculation processor according to the present specification is integrated into a mobile terminal, a corresponding depth camera can adequately perform data calculation, and an exception such as a data calculation error can be avoided, thereby further achieving applications such as facial recognition, 3D scanning, gesture interaction, and AR with higher precision.

DETAILED DESCRIPTION OF THE INVENTION

Figure 1:
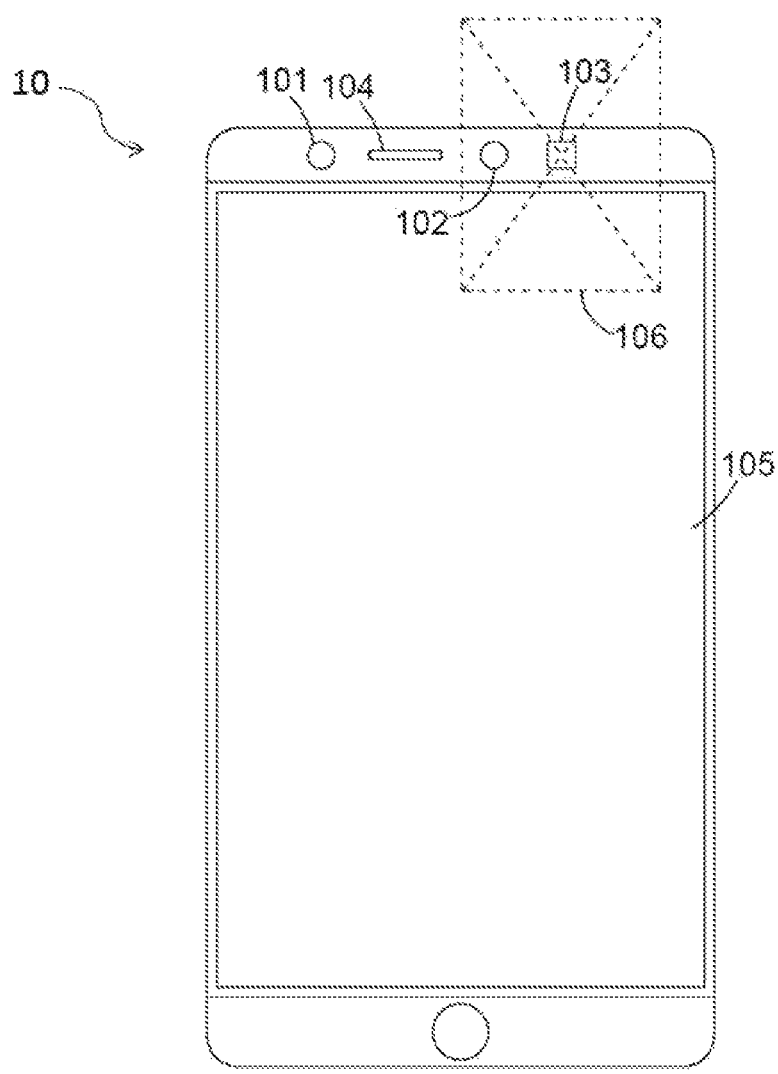
FIG. 1 is a schematic structural diagram of a front view of a mobile terminal, according to an embodiment of the present specification.

The following clearly describes the present specification with reference to the specific implementations and accompanying drawings. Unless otherwise specified, the same reference numerals represent the same parts. It should be noted that the following description is merely some embodiments of the present specification, but does not limit the present specification.

FIG. 1 is a schematic structural diagram of a front view of a mobile terminal, according to an embodiment of the present specification. A mobile terminal 10 includes the front of a display screen 105, a sensor area at the top, and an application processor (not shown in the figure). The sensor area at the top includes a projection module 101, a color camera 102, an acquisition module 103, and a sensor 104 such as a microphone and an ambient light sensor/proximity sensor. The display screen 105 may be a liquid crystal display (LCD), an organic light-emitting diode (OLED) display or the like, and is configured to display an application image (i.e., an image of the application). The display screen may further include a touch function as an input apparatus for human-machine interactions.

As a part of the depth camera, the projection module 101 is responsible for transmitting a signal of the depth camera, and the acquisition module 103 is responsible for receiving a signal of the depth camera. For example, for a structured light depth camera, the projection module 101 may be an Infrared (IR) laser speckle pattern projector, and the acquisition module 103 may be an IR camera corresponding to the IR laser speckle pattern projector. The IR laser speckle pattern projector is configured to transmit a preset speckle pattern with a specific wavelength to a surface of a space object. The preset speckle pattern is imaged in the IR camera after being reflected by the surface of the object. In this way, the IR camera can obtain an IR speckle image modulated by the object. Furthermore, the IR speckle image is calculated by a depth calculation processor (not shown in the figure) to generate a corresponding depth image. Generally, a light source in a projector may be selected as a near infrared (NIR) light source with a wavelength of 850 nm, 940 nm or the like. A type of the light sources may be an edge-emitting laser, a vertical-cavity surface-emitting laser (VCSEL), a corresponding light source array or the like. Speckles, for example, speckles 303 shown in FIG. 3 or speckles 304 shown in FIG. 4, in the preset speckle pattern are generally distributed randomly to achieve irrelevance of sub-areas in a direction or a plurality of directions. That is, any one sub-area selected in a direction satisfies a requirement of relatively high uniqueness. Optionally, in some embodiments, the projection module 101 may be formed by a light-emitting diode (LED), a laser, and other light sources that can transmit wavelengths such as visible light and ultraviolet light and may be configured to transmit structured light patterns such as a stripe, a speckle, and a two-dimensional (2D) code.

In some embodiments, the depth camera may be a depth camera based on time of flight (TOF) (i.e., a TOF depth camera), a binocular depth camera, and the like. For the TOF depth camera, the projection module is configured to transmit a pulsed beam, the acquisition module is configured to receive a pulsed beam reflected by an object, and the processor is configured to calculate depth information of the object according to a time interval between the transmission and the reception. There are two types of binocular depth cameras. One type is an active binocular depth camera that includes one projection module and two acquisition modules. The projection module projects a structured light image on an object. The two acquisition modules separately obtain two structured light images. The processor directly calculates a depth image by using the two structured light images. The other type is a passive binocular depth camera that includes two acquisition modules. The two acquisition modules acquire two images. The processor directly calculates a depth image by using the two images. A structured light depth camera is used as an example to describe the concept of the present specification below. It can be understood that, corresponding content of the present specification may also be applied to other types of depth cameras.

Figure 2:
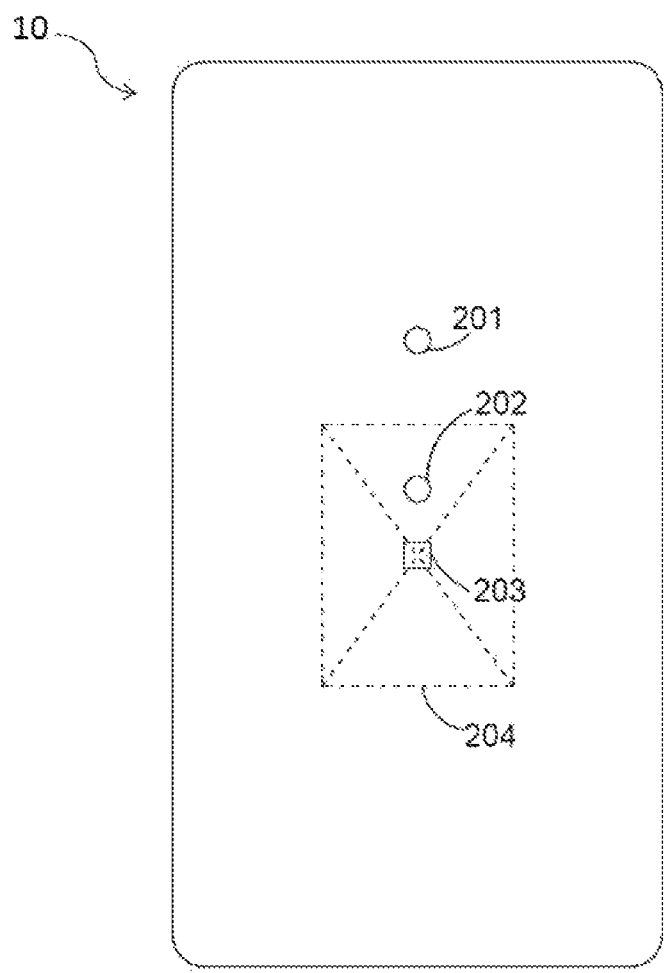
FIG. 2 is a schematic structural diagram of a rear view of a mobile terminal, according to an embodiment of the present specification.

FIG. 2 is a schematic structural diagram of a rear view of a mobile terminal, according to an embodiment of the present specification. To enable the mobile terminal 10 to obtain depth images in different directions, the rear of the mobile terminal 10 is also provided with a projection module 201, an acquisition module 203, and a color camera 202.

After obtaining a depth image, a depth camera transmits the depth image to an application processor of the mobile terminal for further processing. For example, the depth image is applied to applications such as image segmentation, background blurring, facial recognition, facial identification, and facial payment, and the depth image may also be displayed on a display screen.

In some embodiments, the mobile terminal 10 is provided with a structured light depth camera on the front and a TOF depth camera on the back. Compared with the TOF depth camera, the structured light depth camera has a higher resolution, so that when performing facial recognition by using the structured light depth camera, a facial depth image with a higher resolution can be obtained to improve recognition precision. For the rear TOF depth camera, because of its longer measurement distance and higher measurement precision, it can perform depth measurement on an object at a long distance more adequately, thereby further implementing applications such as 3D modeling and AR.

In some embodiments, the projection module 101 and the acquisition module 103 of the depth camera located in the front of the mobile terminal 10 are arranged transversely along the mobile terminal. That is, a direction of a connecting line (generally referred to as a baseline) between the projection module 101 and the acquisition module 103 is a horizontal direction. The transverse direction herein is a horizontal direction when the mobile device is placed to the front, as shown in FIG. 1. A direction of a baseline between the projection module 201 and the acquisition module 203 of the depth camera disposed in the rear of the mobile terminal is a vertical direction, as shown in FIG. 2. An advantage of such an arrangement is that a larger space for placing the display screen can be provided in the front, and the rear can be arranged in a longitudinal direction to achieve a better visual effect. In an embodiment, a baseline distance (the "baseline distance" herein is a distance between the projection module and the acquisition module) of the reared depth camera is greater than a baseline distance of the front depth camera. In one aspect, a larger volume is provided in the rear to accommodate a longer baseline arrangement. In another aspect, a longer baseline can implement measurement of a depth image of an object at a longer distance, which is highly beneficial for applications such as 3D scanning, AR, and other applications based on the reared depth camera.

The display screen 105 and an image sensor (for example, a charge-coupled device (CCD) or a complementary metal-oxide-semiconductor (CMOS)) in the acquisition module 103 are both rectangular. For example, a length-to-width ratio (which is a length-to-width ratio of a size or a ratio of a quantity of pixels in the length direction to that in the width direction) of the display screen 105 can be 4:3, 2:1 or the like. A length-to-width ratio (which is a ratio of a quantity of pixels in the length to that in the width direction in an embodiment) of the image sensor can be 640:480, 1600:1200 or the like. Therefore, in an embodiment, when the depth camera is integrated into the mobile terminal, the length and width directions of the image sensor in the acquisition module are configured to be consistent with those of the display screen. Therefore, after a depth image is obtained, the depth image displayed on the display screen can have a better effect of displaying.

As shown in FIG. 1, the acquisition module 103 is provided with a field of view 106. It is assumed that the length-to-width ratio of the image sensor in the acquisition module 103 is consistent with that of the field of view, and a short axis direction of the image sensor is set to be consistent with the baseline direction. Such a configuration can ensure that the length and width directions of the image sensor in the acquisition module are consistent with those of the display screen. Similarly, in FIG. 2, the acquisition module 203 is provided with a field of view 204, and the length and width directions of the field of view are also configured to be consistent with those of the rear contour, that is, to be consistent with those of the display screen in the front. A long axis direction of the image sensor in the acquisition module 203 is consistent with the baseline direction. In this way, after a depth image is obtained, the depth image displayed on the display screen in the front can have a better effect of displaying.

Figure 3:
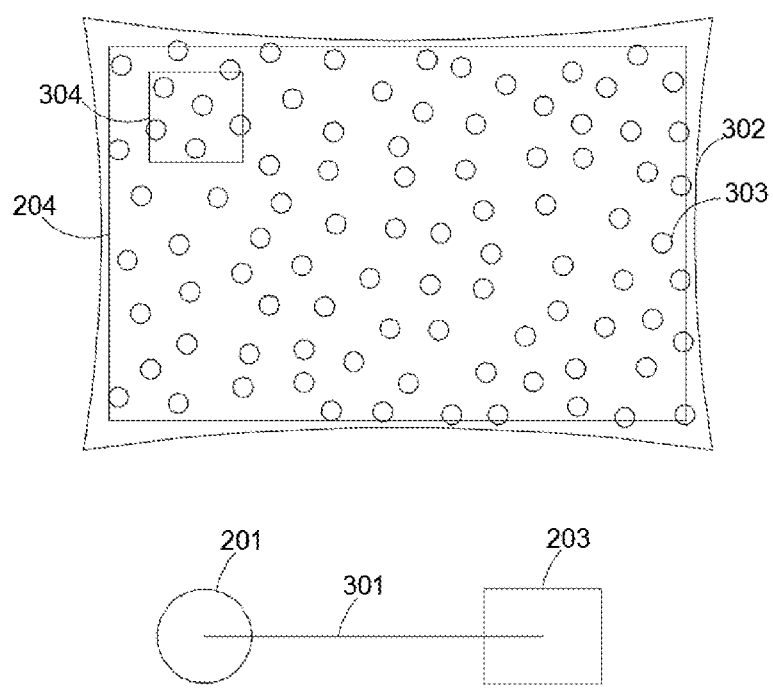
FIG. 3 is a schematic structural diagram of a depth camera, according to an embodiment of the present specification.

FIG. 3 is a schematic diagram of a depth camera, according to an embodiment of the present specification. A direction of a baseline 301 between the projection module 201 and the acquisition module 203 and the length and width directions of the image sensor in the acquisition module 203 are consistent with those of the depth camera shown in FIG. 2. In this embodiment, the baseline direction is consistent with the long axis direction of the image sensor. The projection module 201 projects a speckle image area 302 on a space. The acquisition module 203 is configured to acquire a speckle image in a field of view area 204. Generally, a projection area 302 of the projection module 201 needs to be large enough in the area of the measurement range to cover the field of view 204 of the acquisition module 203. A long axis direction of the image sensor in the acquisition module 203 is consistent with the baseline direction shown in the figure. Therefore, a long axis direction of the field of view 204 of the acquisition module 203 is also consistent with the baseline direction. Therefore, the projection area 302 of the projection module 201 should also be projected into a speckle image with a long axis direction consistent with the baseline direction. In consideration of a parallax between the projection module 201 and the acquisition module 203, and there are different overlapping areas of two field of view areas of the projection module 201 and the acquisition module 203 in the baseline direction in planes with different depth values, thus a length of the projection area 302 in the baseline direction should be greater than that of an acquisition field of view. It can be understood that, both the projection area and the field of view area are generally tapered in a three-dimensional space. The above descriptions are shown only in a two-dimensional plane. If the description is shown in a three-dimensional space, it may be considered that a projection angle of the projection area 302 in the baseline direction is greater than an acquisition area angle of the acquisition module.

In addition, the projection module is generally provided with a projection lens. Considering distortion of a lens, the projection area 302 will deform to some extent, resulting in, for example, pincushion distortion shown in FIG. 3.

Figure 4:
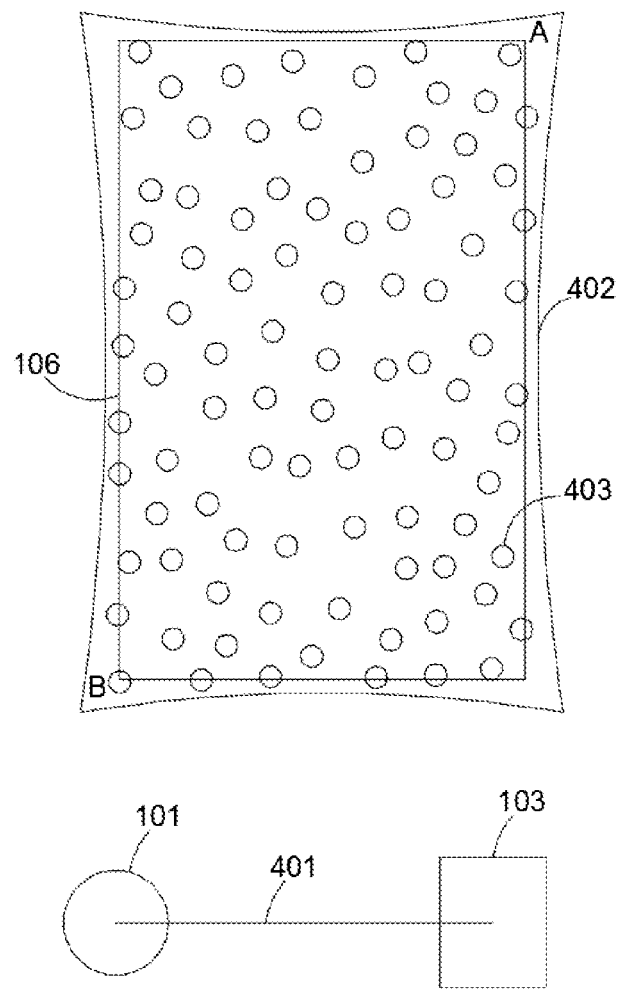
FIG. 4 is a schematic structural diagram of a depth camera, according to another embodiment of the present specification.

FIG. 4 is a schematic diagram of a depth camera, according to another embodiment of the present specification. A direction of a baseline 401 between the projection module 101 and the acquisition module 103, and the length and width directions of the image sensor in the acquisition module 103 are consistent with those of the depth camera shown in FIG. 1. In this embodiment, the baseline direction is consistent with a short axis direction of the image sensor. The projection module 101 projects a speckle image area 402 on a space, and the acquisition module 103 is configured to acquire the speckle image in the field of view area 106. Similar to the embodiment shown in FIG. 3, the projection area 402 of the first projection module 101 needs to be large enough in the area of the measurement range to cover the field of view 106 of the first acquisition module 103.

When the depth camera is integrated into the mobile terminal, an integration mode and a data processing mode of each component need to be considered comprehensively. Otherwise problems usually occur when the depth camera is integrated into the mobile terminal, and as a result, the depth camera cannot adequately perform data calculation and fails to function properly in the mobile terminal. To resolve the foregoing problems, a depth calculation processor is provided.

The present specification provides a depth calculation processor, including: an input port, configured to receive image data from an image sensor; a demultiplexer (DEMUX), connected to the input port, and configured to demultiplex the image data from the input port and output first image data into a first line and second image data into a second line; a grayscale image engine, configured to receive and process the first image data from the first line to generate processed first image data; a depth image engine, configured to receive the second image data from the second line, and calculate depth image data based on the second image data; a multiplexer (MUX), configured to receive and output the processed first image data from the grayscale image engine and the depth image data from the depth image engine; and an output port, configured to receive and output the processed first image data and the depth image data from the MUX.

In an alternative implementation, the input port and/or the output port is an MIPI interface.

Figure 5:
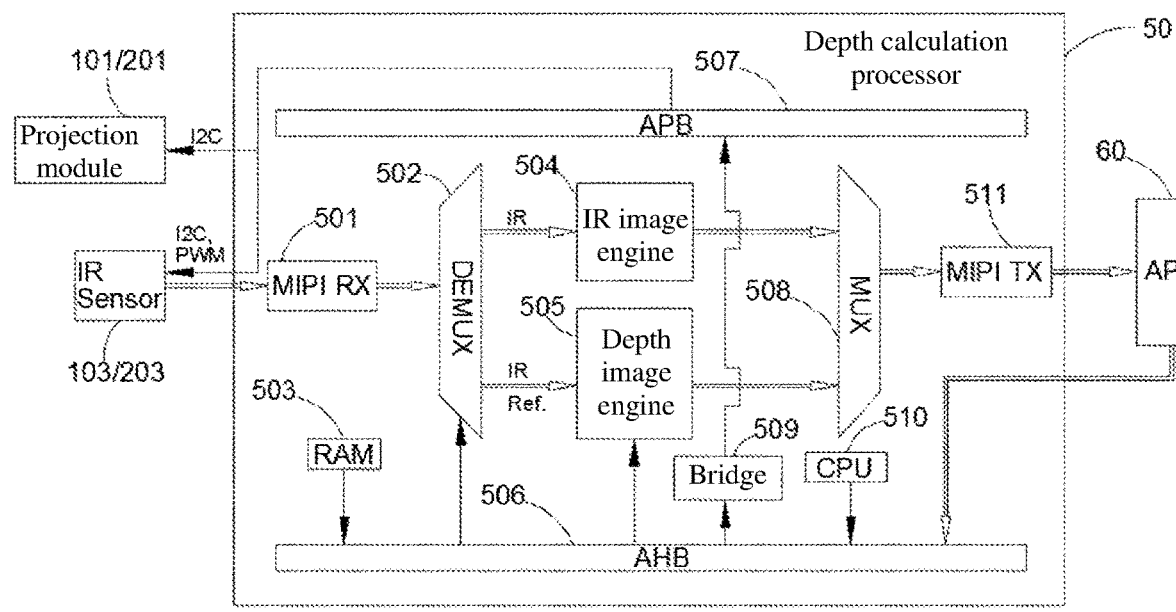
FIG. 5 is a block diagram of a depth calculation processor, according to an embodiment of the present specification.

FIG. 5 is a schematic diagram of an architecture of a depth calculation processor, according to an embodiment of the present specification. A depth calculation processor 50 controls the projection module 101/projection module 201 to perform projection, controls the acquisition module 103/ acquisition module 203 (the IR camera/IR sensor herein is used as an example for description, and the "IR camera/IR sensor" is referred to as "IR sensor" for short below) to acquire images, receives a speckle image obtained by the IR sensor, and output a calculated depth image to a mobile terminal processor, for example, an application processor (AP) 60.

The depth calculation processor 50 may be an independent dedicated integrated circuit manufactured by using a single semiconductor, and is, for example, a processor circuit in the form of a system-on-a-chip (SOC), application-specific integrated circuit (ASIC), field-programmable gate array (FPGA) or the like. The depth calculation processor mainly includes parts as follows.

A depth image engine 505 is configured to: receive a data flow of an IR image (which is represented by "IR" in FIG. 5) of an IR sensor 103/IR sensor 203 through an input MIPI receive (RX) interface 501, read reference image data (which is represented by "Ref" in FIG. 5) from an internal or external memory (not shown in the figure) of the processor, and then calculate a depth value, wherein a calculated depth image data flow is output to the AP 60 of the mobile terminal through an output MIPI transmit (TX) interface.

In some embodiments, considering that IR images need to be output in some applications, the processor 50 is provided with a grayscale image engine. Because an IR image is used in this embodiment, the grayscale image engine is referred to as an IR image engine 504. The IR image engine is used as an example in all of the following descriptions. However, the present specification is not limited thereto. The grayscale image engine may be another grayscale image engine such as an ultraviolet grayscale image engine or a far infrared (FIR) grayscale image engine. The IR image engine 504 receives the data flow of the IR image transmitted through the MIPI RX interface, performs processing such as denoising and contrast control on the IR image, and output the processed IR image to the AP 60 of the mobile terminal through the MIPI TX interface.

In some embodiments, the input and output of the depth image engine 505 and the IR image engine 504 are satisfied by merely using a single MIPI interface. At a receive end, the MIPI RX interface is connected to a DEMUX 502, and the IR image is demultiplexed by the DEMUX 502 into two paths to separately enter the IR image engine 504 and the depth image engine 505. At an output end, the IR image engine 504 and the depth image engine 505 are separately connected to a MUX 508 to transmit data through the single line MIPI TX. The DEMUX 502 and the MUX 508 are controlled by a central processing unit (CPU) 510 to implement specific functions of demultiplexing and multiplexing. For example, in a pure IR image acquisition mode, the MIPI RX 501 transmits an IR image data flow through the DEMUX 502. Data in the IR image data flow (i.e., the first image) is transmitted to the IR image engine 504 under the control of the CPU 510. The data is processed, and the processed data (i.e., the processed first image) is transmitted to the AP 60 through the MUX 508 and the MIPI TX 511. For another example, in a depth image acquisition mode, the MIPI RX 501 transmits an IR speckle image data flow (i.e., the second image) to the depth image engine 505 through the DEMUX 502. At the same time, the depth image engine 505 reads reference image data from the internal or external memory (not shown in the figure) of the processor, and then performs depth value calculation. The calculated depth image data flow is output to the AP 60 through the MUX 508 and the MIPI TX 511. The depth calculation processor further supports a hybrid image acquisition mode. That is, the MIPI RX 501 receives a data flow from the IR sensor 103/IR sensor 203. Data flows from the DEMUX 502 alternately enter the IR image engine 504 and the depth image engine 505 according to a particular timing. The data flows also pass through the MUX 508 and the MIPI TX 511 at the output end according to a particular timing to alternately output an IR image and a depth image to the AP 60.

The depth calculation processor 50 further includes a CPU 510, a bus, a random access memory (RAM) 503. In some embodiments, the bus includes an Advanced Microcontroller Bus Architecture (AMBA) High-performance Bus (AHB) 506 and an Advanced Peripheral Bus (APB) 507. The AHB 506 is used for communications between the CPU 510 and all other parts. The APB 507 is mainly configured to control peripherals such as the projection module 101/projection module 201 and the IR sensor 103/IR sensor 203. The AHB 506 and the APB 507 are connected by a bridge 509.

To improve efficiency and reduce storage costs, the image sensor of the acquisition module adopts a shutter trigger when obtaining an image. That is, the data is output row by row or column by column, i.e. the image is output in a pipelined form through a corresponding interface. During depth value calculation, as shown in FIG. 3, when all data of a sub-window 304 is output from the image sensor, the data and a reference speckle image will be matched and calculated. That is, in the reference speckle image, a sub-area with the highest similarity and located in the same row and column as the center of the sub-window in the baseline direction is searched to obtain a relative deviation value. The depth value is calculated according to the deviation value.

According to the embodiment shown in FIG. 3, the speckle image in the area 204 is acquired and output line by line from top to bottom in a short axis direction starting from the top left corner. Therefore, the depth calculation can be performed after the speckle image is output to the nth line, and n is not less than the line number of a line at which the sub-window 304 is located. Therefore, depth values of most pixels in the image have been calculated when the entire image has been transmitted. In other embodiments, depth values can be calculated after all the speckle images in the area 204 have been acquired and output. However, the calculation efficiency of depth values in the former embodiment is higher than that in the latter embodiment.

Figure 6:
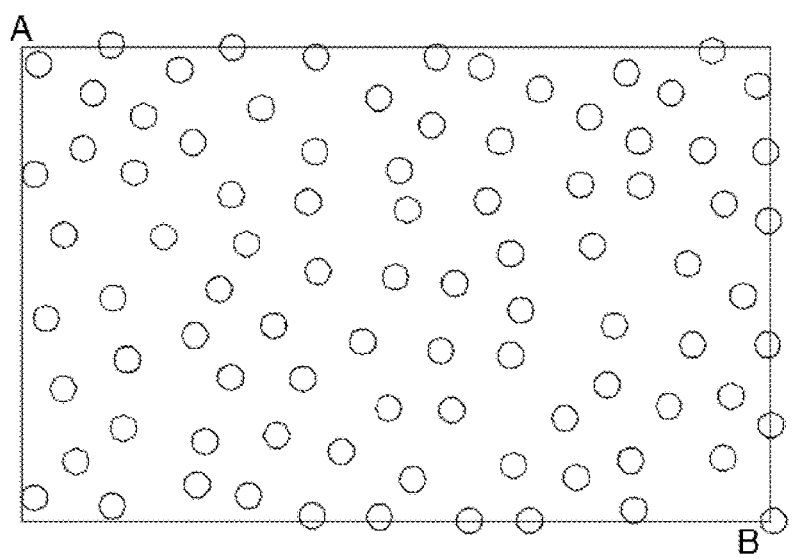
FIG. 6 is a schematic diagram of an output speckle image, according to the embodiment shown in FIG. 4 of the present specification.

The image sensor usually obtains and outputs data row by row or column by column in the short axis direction. Therefore, in the embodiment shown in FIG. 4, data output is not affected when the image sensor in the acquisition module 103 is vertically placed. The image sensor outputs data column by column in the short axis direction starting from the pixel at a point A to a point B. An output speckle image is shown in FIG. 6. Obviously, the obtained speckle image (shown in FIG. 6) is evidently different from an actual image (a speckle image in the area 106 shown in FIG. 4). Therefore, a result is prone to an error when the depth image is calculated by the depth calculation processor.

It can be known from the embodiments shown in FIG. 3 and FIG. 4 that when the image sensor is placed in a direction different from a direction of a relative position of the baseline, the depth image calculated by the depth calculation processor is different, which may easily lead to errors in the result. To resolve the problem, a solution that is easily conceivable is to specially customize the image sensor in the acquisition module 103 shown in FIG. 4. That is, the image sensor is enabled to read data line by line from the top left corner in the long axis direction. However, such a solution is faced with huge costs. The present specification provides a depth image engine to accurately calculate a depth image of the depth camera in the embodiment shown in FIG. 4.

Figure 7:
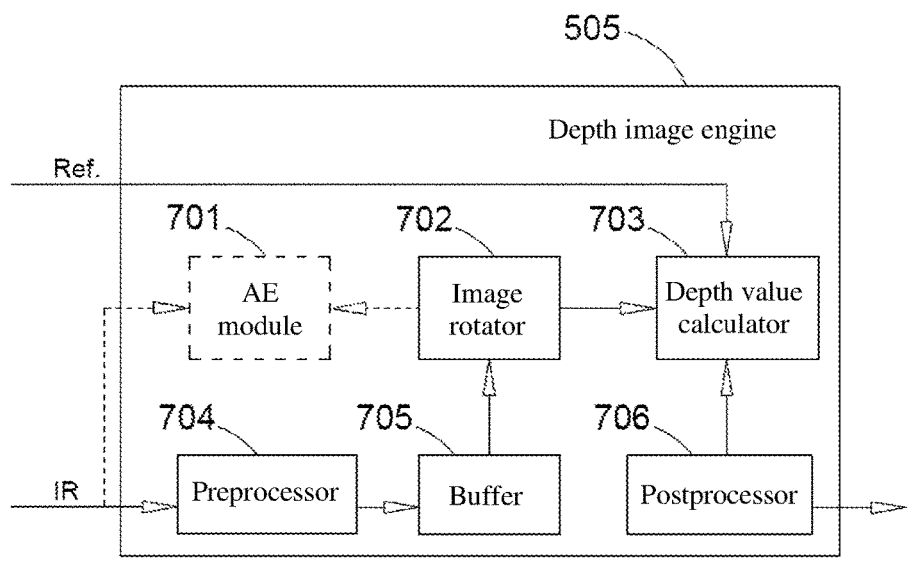
FIG. 7 is a block diagram of a depth image engine, according to an embodiment of the present specification.

FIG. 7 is a schematic architectural diagram of a depth image engine, according to an embodiment of the present specification. The depth image engine includes a preprocessor 704, a buffer 705, an image rotator 702, a depth value calculator 703, and a postprocessor 706. A depth image engine 505 receives an IR speckle image data flow (IR) from an MIPI RX 501 or a DEMUX 502, reads reference image data (Ref) from an internal or external memory of a processor, and performs depth value calculation to output a depth image. In this embodiment, after entering the depth image engine 505, the IR speckle image data flow is preprocessed by the preprocessor 704, to perform denoising, filling, and other steps. The processed data flow then enters the buffer 705. After all data of the entire IR speckle image enters the buffer 705, the IR speckle image data is transmitted to the image rotator 702. The image rotator 702 rotates the IR speckle image, for example, rotates the speckle image in FIG. 6 to turn the speckle image into the speckle image in the area 106 shown in FIG. 4. In this way, the error of depth image calculation caused by a placement position of image sensor or a data reading mode can be avoided. The rotated speckle image and the reference image enter the depth value calculator 703 at the same time. The depth value calculator 703 performs matching calculation to generate a deviation value, and directly calculates a depth value based on the deviation value. A calculation formula is shown as follows:

$$Z_D = \frac{BfZ_0}{Bf - Z_0\Delta}$$

B is a distance of a baseline between an acquisition module and a projection module, $Z_0$ is a depth value of a distance between a known plane and the acquisition module during acquisition by the reference image, and f is a focal length of a lens of the acquisition module. After $Z_D$ of each pixel in the speckle image is calculated by using the above formula, a corresponding depth image can be obtained. Next, the depth image is processed by the postprocessor 706 and output. It can be understood that, FIG. 7 merely schematically shows an implementation solution. The modules are not completely independent. For example, the preprocessor 704 and the buffer 705 may be combined or may be combined with the image rotator 702 to form a single module. In addition, the preprocessor 704 and the postprocessor 706 are not indispensable modules, and are disposed to obtain depth images with higher quality.

It can be understood that, the image rotator 702 simply describes a visual difference between input and output images in effect. The image rotator 702 can perform the operation in any form. For example, the input data can be rearranged in a particular format to achieve the "rotation" effect, or the input data can be output in a particular order to achieve the "rotation" effect.

In some embodiments, to improve the depth image quality, an AE module 701 is disposed in the depth image engine 505 and/or the IR image engine 504. After an IR image is obtained, the AE module performs area grayscale value calculation or histogram calculation on the IR image, and stores a calculated value corresponding to an exposure amount in a register (not shown in the figure) in the engine. The CPU 510 invokes the value to compare the value with a preset threshold. If the value is not within a threshold range, the CPU controls the exposure amount of the IR sensor 103/IR sensor 203 through an Inter-Integrated Circuit (I2C) bus interface to implement AE adjustment. The AE module 701 can directly receive the IR image data flow transmitted by the IR sensor 103/IR sensor 203, and receive an image processed by the preprocessor 704, the buffer 705 and/or the image rotator 702.

Figure 8:
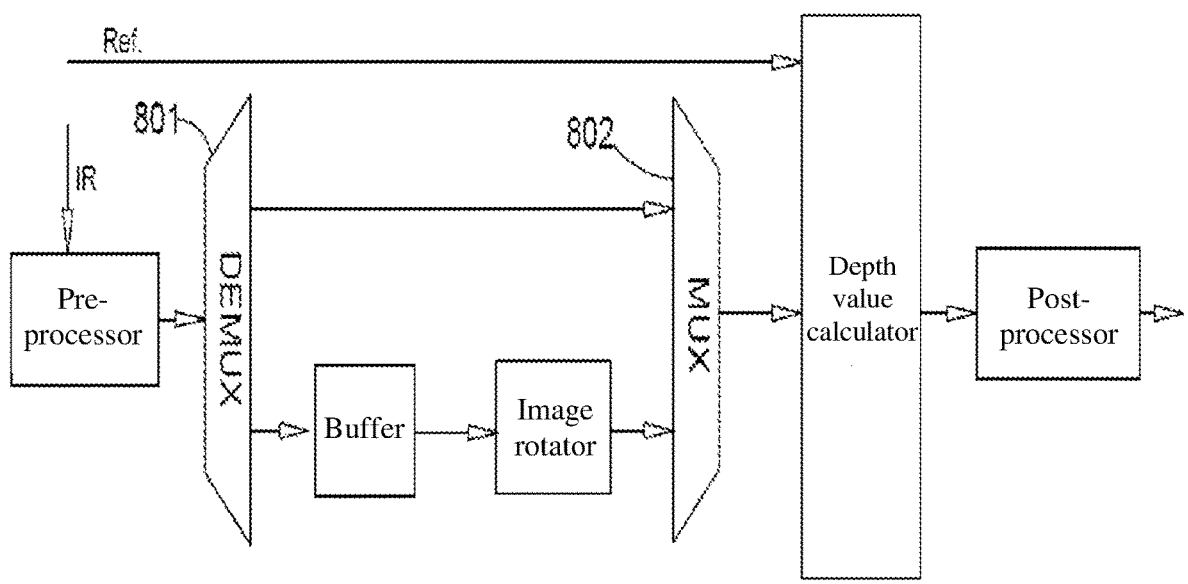
FIG. 8 is a block diagram of a depth image engine, according to another embodiment of the present specification.

FIG. 8 is a schematic architectural diagram of a depth image engine, according to another embodiment of the present specification. An IR image is preprocessed by a preprocessor and then passes through a DEMUX 801. The DEMUX 801 can choose whether to make the IR image pass through an image rotator. A MUX 802 is arranged before the IR image entering a depth value calculator. Compared with the embodiment shown in FIG. 7, the depth image engine in the embodiment can simultaneously cope with the two depth calculation scenarios shown in FIG. 3 and FIG. 4. That is, during calculation of a depth value in the embodiment shown in FIG. 3, it may be chosen to make an IR image to bypass the buffer and the image rotator. During calculation of a depth value in the embodiment shown in FIG. 4, it may be chosen to make an IR image pass through the buffer and the image rotator, thereby avoiding high costs in independent development. In a preferred implementation, the DEMUX 801 and the MUX 802 are controlled by a CPU to implement specific functions of demultiplexing and multiplexing.

The depth calculation processor mentioned in the foregoing embodiments may be an independent dedicated chip or may be an internal IP core as an SOC. In addition, software using algorithms to realize functions such as a depth calculation processor also falls within the protection scope of the present specification. For example, implementation of similar functions by another programmable processor (for example, an FPGA) or computer software shall also fall within the scope of the present specification.

In addition, it should be noted that, according to a requirement of implementation, each part described in the present specification can be divided into more parts, or two or more parts may be combined into a new part to achieve an objective of the present specification, which are all simple variations or alterations made to the present specification and fall within the protection scope of the present specification. In addition, in the present specification, "first" and "second" are only used for distinguishing in description and have no special meanings.

The foregoing content further describes the present specification in detail with reference to specific preferred implementations, and it should not be considered that the specific implementations of the present specification are limited to the descriptions. A person skilled in the art of the present specification may further make some equivalent replacements or obvious variations without departing from the concept of the present specification, the performance or functions of the replacements or variations are the same as those in the present specification, and the replacements or variations shall all fall within the protection scope of the present specification.

What is claimed is:

1. A depth calculation processor, comprising:
   an input port, configured to receive image data from an image sensor;
   a demultiplexer (DEMUX), connected to the input port, and configured to demultiplex the image data from the input port and output first image data into a first line and second image data into a second line;
   a grayscale image engine, configured to receive and process the first image data from the first line to generate processed first image data;
   a depth image engine, configured to receive the second image data from the second line, and calculate depth image data based on the second image data;
   a multiplexer (MUX), configured to receive and output the processed first image data from the grayscale image engine and the depth image data from the depth image engine; and
   an output port, configured to receive and output the processed first image data and the depth image data from the MUX.

2. The depth calculation processor according to claim 1, wherein the input port and/or the output port is a Mobile Industry Processor Interface (MIPI) interface.

3. The depth calculation processor according to claim 1, wherein the depth image engine comprises:
   a buffer, configured to receive the second image data from the second line;
   an image rotator, configured to perform, after the buffer receives the entire second image data from the second line, a rotation operation on the second image data from the second line to generate a rotated image; and
   a depth value calculator, configured to receive the rotated image and a reference image to perform a matching calculation to generate the depth image data.

4. The depth calculation processor according to claim 3, wherein the grayscale image engine and/or the depth image engine further comprises an automatic exposure (AE) module, wherein the AE module is configured to: receive the first image data from the first line and/or the second image data from the second line, and calculate a value reflecting an exposure amount.

5. The depth calculation processor according to claim 1, wherein the second image data from the second line comprises infrared (IR) structured light image data.

* * * * *